United States Patent
Beschieru et al.

(10) Patent No.: US 9,233,593 B2
(45) Date of Patent: Jan. 12, 2016

(54) AIR-CONDITIONING SYSTEM FOR AN AUTOMOBILE AND METHOD FOR OPERATING AN AIR-CONDITIONING SYSTEM OF AN AUTOMOBILE

(75) Inventors: Vladimir Beschieru, Ruesselsheim (DE); Ioannis Lazaridis, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 199 days.

(21) Appl. No.: 13/276,625

(22) Filed: Oct. 19, 2011

(65) Prior Publication Data
US 2012/0090806 A1    Apr. 19, 2012

(30) Foreign Application Priority Data
Oct. 19, 2010    (DE) .......................... 10 2010 048 853

(51) Int. Cl.
*F25B 7/00*     (2006.01)
*B60H 1/00*    (2006.01)
*B60L 1/00*     (2006.01)
*B60L 11/18*   (2006.01)

(52) U.S. Cl.
CPC ........ *B60H 1/00278* (2013.01); *B60H 1/00885* (2013.01); *B60L 1/003* (2013.01); *B60L 11/1874* (2013.01); *B60H 2001/00307* (2013.01); *B60H 2001/00928* (2013.01); *B60H 2001/00949* (2013.01); *B60L 2240/34* (2013.01); *B60L 2240/36* (2013.01); *B60L 2240/545* (2013.01)

(58) Field of Classification Search
CPC ........... B60H 1/00278; B60H 1/00885; B60H 2001/00928; B60H 2001/00307
USPC .................................. 62/244, 175, 335, 333
See application file for complete search history.

(56) References Cited

U.S. PATENT DOCUMENTS

| | | | |
|---|---|---|---|
| 6,601,545 B1 | 8/2003 | Hohl | |
| 6,705,101 B2 * | 3/2004 | Brotz et al. | 62/198 |
| 7,147,071 B2 * | 12/2006 | Gering et al. | 237/12.3 B |
| 7,451,808 B2 | 11/2008 | Busse et al. | |
| 7,789,176 B2 * | 9/2010 | Zhou | 180/65.1 |
| 7,975,757 B2 | 7/2011 | Nemesh et al. | |
| 2004/0000161 A1 * | 1/2004 | Khelifa et al. | 62/324.1 |
| 2004/0050544 A1 * | 3/2004 | Hohl et al. | 165/202 |
| 2005/0133215 A1 * | 6/2005 | Ziehr et al. | 165/202 |
| 2006/0196634 A1 * | 9/2006 | Sato et al. | 165/41 |

(Continued)

FOREIGN PATENT DOCUMENTS

| | | |
|---|---|---|
| DE | 19730678 A1 | 1/1999 |
| DE | 19954327 A1 | 7/2001 |

(Continued)

*Primary Examiner* — Jonathan Bradford
*Assistant Examiner* — Elizabeth Martin
(74) *Attorney, Agent, or Firm* — Ingrassia Fisher & Lorenz PC

(57) ABSTRACT

An air-conditioning system is provided for an automobile comprising an interior air-conditioning module, which can be connected in a heat-transporting manner to at least two coolant-carrying cooling circuits of the automobile via valves (e.g., controllable or adjustable valves). A controller is also provided that is configured to control the valves in such a manner that those cooling circuits having the higher coolant temperature can be connected in a heat-transporting manner to the interior air-conditioning module. A method is also provided for operating an air-conditioning system.

12 Claims, 2 Drawing Sheets

(56) References Cited

U.S. PATENT DOCUMENTS

2008/0295535 A1* 12/2008 Robinet et al. ............... 62/259.2
2009/0280395 A1    11/2009 Nemesh et al.

FOREIGN PATENT DOCUMENTS

DE    102009033959 A1    1/2010
EP         1637709 A2    3/2006

* cited by examiner

AIR-CONDITIONING SYSTEM FOR AN AUTOMOBILE AND METHOD FOR OPERATING AN AIR-CONDITIONING SYSTEM OF AN AUTOMOBILE

CROSS-REFERENCE TO RELATED APPLICATION

This application claims priority to German Patent Application No. 102010048853.4, filed Oct. 19, 2010, which is incorporated herein by reference in its entirety.

TECHNICAL FIELD

The technical field relates to an air-conditioning system and a method for operating an air-conditioning system, which comprises at least two coolant-carrying cooling circuits and an interior air-conditioning module.

BACKGROUND

Air-conditioning systems are known in the prior art. Almost every automobile has a heater for the passenger compartment in order to achieve pleasant temperatures in the passenger compartment and to prevent misting up of the windowpanes, particularly the windshield. Automobiles frequently also have air-conditioning systems, with which interiors can be cooled. In conventional automobiles, the air-conditioning system acquires the necessary thermal energy from the waste heat of an internal combustion engine. In the case of highly efficient internal combustion engines, for example, modern diesel-operated engines and/or in the case of large interior volumes, auxiliary heaters are provided in some cases in order to be able to heat the interior more rapidly.

Due to the operating principle, vehicles driven by electricity produce less waste heat than vehicles driven by internal combustion engines. Therefore electrical auxiliary heaters in particular are absolutely essential in such vehicles. Since the range of electric vehicles is limited, the use of electrical auxiliary heaters causes a considerable reduction in the possible range of electric vehicles. Known from US 2009/0280395 A1 is a thermal system for a battery of an automobile, which is coupled to an air-conditioning system of the automobile.

It is therefore the object to provide an air-conditioning system that ensures a high yield of the waste heat produced in order to thereby reduce the energy consumption required for the interior heating. In addition, other objects, desirable features and characteristics will become apparent from the subsequent summary and detailed description, and the appended claims, taken in conjunction with the accompanying drawings and this background.

SUMMARY

An air-conditioning system is provided for an automobile comprises an interior air-conditioning module that can be connected in a heat-transporting manner to at least two coolant-carrying cooling circuits of the automobile. Such an interior air-conditioning module usually comprises a heat exchanger via which heat transported through the coolant can be delivered to the interior. For this purpose, for example, a fan can be provided, which delivers the heat of the heat exchanger to air which is blown into the interior.

Furthermore, a regulation or control is provided, which is configured to control the controllable or adjustable valves in such a manner that those cooling circuits having the higher coolant temperature can be connected in a heat-transporting manner to the interior air-conditioning module. In this way, the waste heat removed from a unit of the automobile can be used for heating the interior and the overall efficiency of the automobile can be improved.

According to a first possible further embodiment, it can be provided that the at least two coolant circuits are coolant circuits of an electric or hybrid vehicle. In particular, electric vehicles or electric-motor assisted vehicles produce very little waste heat compared with internal combustion engines so that optimizing the air-conditioning system can in particular contribute to reducing the energy consumption and therefore to increasing the range.

According to a further embodiment, it can be provided that the at least two cooling circuits are each provided with temperature sensors, which sensors are connected to the control or regulation in a signal-conducting manner. The cooling circuit having the higher temperature can thus be reliably selected.

According to a further embodiment, it can be provided that the at least one of the cooling circuits is a drive cooling circuit, a power electronics cooling circuit, a charger cooling circuit, a battery cooling circuit, and/or an air-conditioning system cooling circuit. In electric or hybrid vehicles the aforesaid units, drive power electronics, charger, battery, and/or air-conditioning system deliver waste heat which can be used for interior heating.

According to a further embodiment, it can be provided that the at least two cooling circuits have a common cooler. In this way, the number of required components can be restricted.

Alternatively, according to a further embodiment it can be provided that the at least two cooling circuits have separate coolers. The size of the individual coolers can thus be reduced compared with a common cooler, which makes it easier to arrange the coolers in the vehicle.

According to a further embodiment, a cooling circuit can be provided for interior cooling. Such a cooling system or such an air-conditioning system significantly enhances the comfort.

According to a further embodiment, it can be provided that the cooling system is configured for cooling units of the automobile. In some units, for example, a battery of an electric or hybrid vehicle, it is necessary to maintain a suitable operating temperature. In the case of the battery, a complete energy yield is only achieved within a certain temperature range. At high outside temperatures the cooling capacity of normal waste heat systems can in some cases not be sufficient to ensure the suitable operating temperature. This can be achieved, however with the aid of coupling such a unit to an air-conditioning cooling system.

According to a further embodiment, it can be provided that at least one or more of the at least two cooling circuits each have a bypass for the units to be cooled. In this way, an undesirable removal of heat from the units, particularly at low ambient temperatures, can be prevented and a rapid attainment of the operating temperature can be achieved.

According to a further embodiment, it can be provided that for the at least two cooling circuits at least one bypass is provided around the interior air-conditioning module. In this way, heat transfer to the interior air-conditioning module can be prevented when no heat is required for heating the interior.

According to a further embodiment, it can be provided that the controllable or adjustable valves are configured at least in part as three-way valves. With the aid of three-way valves, coolant flows in the air-conditioning system can be reliably controlled and the complexity of the system can be reduced.

A method is provided for operating an air-conditioning system of an automobile which comprises at least two coolant-carrying cooling circuits, controllable or adjustable valves for controlling or regulating the coolant flow, a regulation or control, and an interior air-conditioning module, where the control controls the controllable or adjustable valves in such a manner that that in each case the cooling circuits having the higher coolant temperature is connected in a heat-transporting manner to the interior air-conditioning module if a heat output to the interior air-conditioning system is required.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or the following detailed description.

Figure 1:
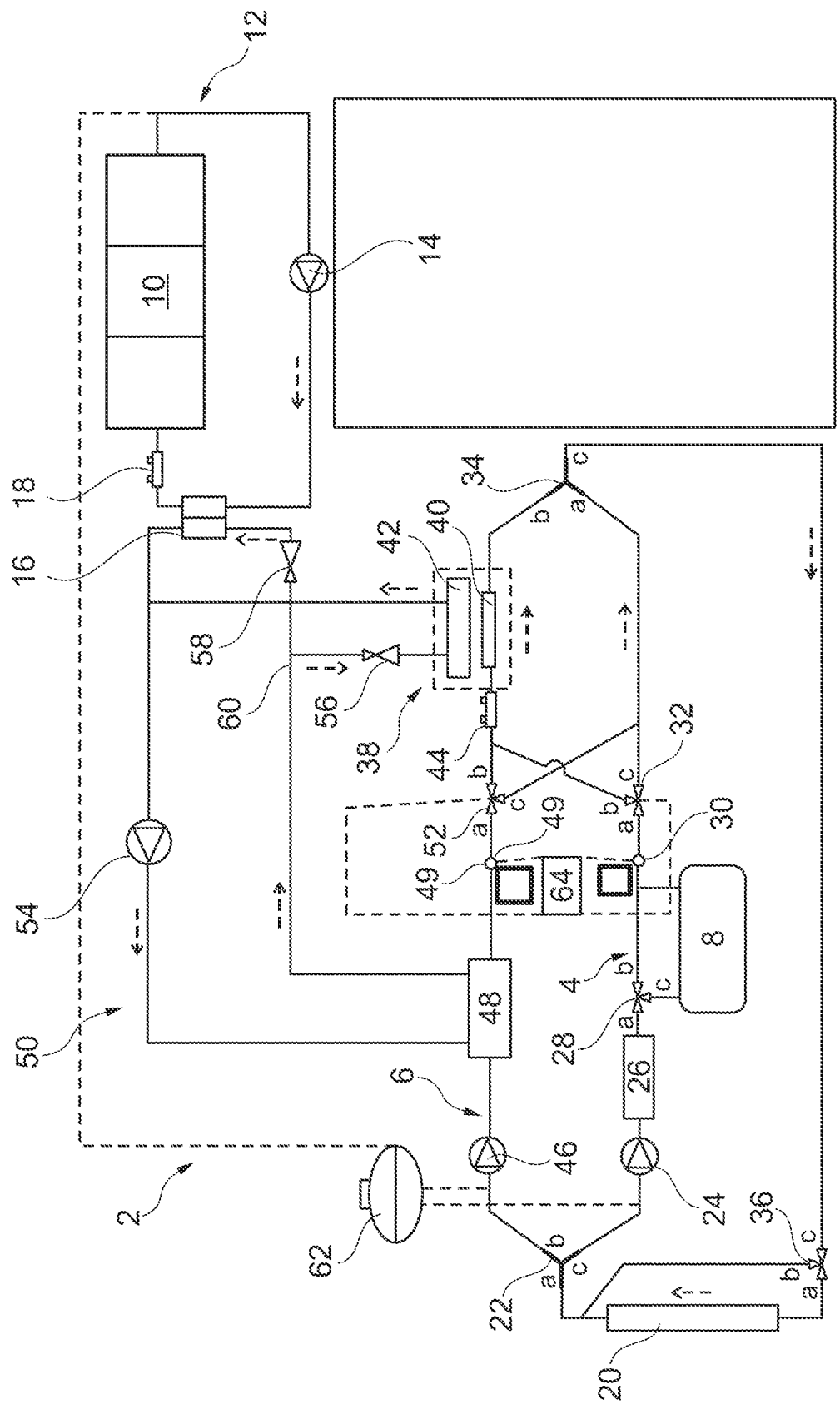
FIG. 1 shows an interior air-conditioning system according to a first embodiment.

FIG. 1 shows an air-conditioning system 2 according to a first embodiment. The air-conditioning system 2 comprises two cooling circuits 4 and 6, where the cooling circuit 4 serves to cool an electric drive motor 8 and the cooling circuit 6 is configured as an air-conditioning system cooling circuit and at the same time serves to cool a battery module 10. Both cooling circuits 4, 6 remove waste heat via a common cooler 20 to the surroundings.

The battery module 10 has a temperature-control circuit 12 in which a coolant is pumped via a pump 14 through a heat exchanger 16, which is thermally coupled to the air-conditioning system cooling circuit 6 by means of a cooling circuit 50. Furthermore an auxiliary heater 18 is provided. Depending on the temperature of the battery module 10, heat can be withdrawn from the temperature-control circuit 12 by means of the heat exchanger 16 or heat can be supplied by means of the auxiliary heater 18 in order to bring or keep the battery module 10 at operating temperature.

The cooling circuit 4 for cooling the electric drive motor 8 is described starting from the cooler 20. Located downstream of the cooler 20 in the flow direction of the coolant is a Y-distributor 22 having an inlet a and outlets b, c. A pump 24 for conveying the coolant is provided along the connection a-c, which supplies the coolant to power electronics 26 to be cooled. A three-way valve 28 having an inlet a and outlets b, c makes a connection to the electric drive motor 8 via the outlet c when the connection a-c is switched to open. When the connection a-b is switched to open, the drive motor 8 is bypassed, which for example brings about more rapid heating of the electric drive motor 8 at low ambient temperatures.

A temperature sensor 30 is provided in the cooling circuit 4 after the electric drive motor 8, which sensor measures the coolant temperatures, in particular the current maximum coolant temperature, in the cooling circuit 4.

Another three-way valve 32 switched thereafter makes a connection with a Y distributor 34 via the connection a-c, which for its part is connected to another three-way valve 36. The cooling circuit is closed toward the cooler 20 by means of the connection a-c of the three-way valve 36. A bypass around the cooler 20 is provided via the connection c-b of the three-way valve 36, which at low ambient temperatures enables the operating temperature of the coolant to be reached more rapidly.

The cooling circuit 4 is connected via the connection a-b of the three-way valve 32 to an air-conditioning module 38, which comprises a heat exchanger 40 for heating the interior and a heat exchanger 42 for cooling the interior. The cooling circuit 4 then makes a connection to the heat exchanger 40. An auxiliary heater 44 is connected upstream of the heat exchanger 40. The heat exchanger 40 is connected to the Y-distributor 34 and thereby closes the first cooling circuit 4.

Depending on the position of the three-way valve 32, therefore flow either takes place or does not take place through the heat exchanger 40 in the first cooling circuit 4. The air-conditioning system cooling circuit 6 is also described starting from the cooler 20. Coolant flowing via the Y distributor 22 via the connection a-b is conveyed with the aid of a pump 46 to a condenser 48, at which a cooling circuit 50 delivers its heat to the air-conditioning system cooling circuit 6.

A second temperature sensor 49 is provided at the position of maximum temperature of the coolant in the second cooling circuit 6. Located downstream of the condenser 48 is a three-way valve 52 which makes a connection to the heat exchanger 40 via its connection a-b and bypasses the heat exchanger 40 via its connection a-c. Depending on the position of the three-way valve 52, heat can therefore be delivered from the air-conditioning system cooling circuit 6 to the heat exchanger 40 of the air-conditioning module 38 for heating the interior of the automobile.

The cooling circuit 50 is described starting from the heat exchanger 16 toward the temperature-control circuit 12 of the battery module 10. Conveyance of the coolant in the cooling circuit 50 is accomplished with the aid of a pump 54. After the pump 54 the cooling circuit 50 opens into the condenser 48. Since the cooling circuit 50 is used both for interior cooling via the heat exchanger 42 and also for cooling of the battery module 10, two expansion valves 56, 58 are provided. Via a branch 60 coolant is conveyed in the cooling circuit 50 partly through the heat exchanger 42 and partly through the heat exchanger 16.

The cooling circuit 50 is preferably operated with a refrigerant as coolant. The refrigerant can, for example, be tetrafluorethane (R-134a) or tetrafluoropropene (R-1234yf). The pump 54 is preferably configured as a compressor by which means the refrigerant is compressed. The refrigerant is then fed to the condenser 48 in which the refrigerant is cooled by delivering its heat to the air-conditioning system cooling circuit 6.

After flowing through the condenser 48, the refrigerant is present substantially in liquid form. The refrigerant is then fed to the expansion valve 56 by which means the pressure of the refrigerant is reduced. From the expansion valve 56 the refrigerant is fed to the heat exchanger 42 which preferably acts as a vaporizer so that the refrigerant is heated on flowing through the heat exchanger 42. For this purpose the heat of the air from the interior of the passenger compartment of the automobile is used so that the air of the interior of the passenger compartment is cooled in this way. After flowing through the heat exchanger 42 the refrigerant is present substantially in gaseous form.

At the branch 60 some of the refrigerant is fed via the expansion valve 58 to the heat exchanger 16 which preferably acts as a vaporizer. By means of the heat exchanger 16 heat is extracted from the cooling medium for cooling the battery module 10 and is fed to the refrigerant. In this way, the heat produced by the battery module 10 is delivered via the cooling circuit 12 to the refrigerant of the cooling circuit 50 and the battery module 10 is cooled. After flowing through the heat exchanger 16, the refrigerant is present substantially in gaseous form.

The cooling circuits 4, 6, and 12 are preferably operated with a cooling liquid as coolant, in particular with water or a mixture of glycol and water, whose state of aggregation remains unchanged within the respective cooling circuit 4, 6 or 12. A common compensating container 60 is assigned to the cooling circuits 4, 6, and 12. It can also be the case that a separate compensating container is assigned to each of the cooling circuits 4, 6, and 12. The compensating container 60 is preferably an expansion vessel. By means of the compensating container 60 the predefined or set pressure inside the cooling circuits 4, 6, 12 can be held approximately at the same level so that any temperature variations of the coolant in the cooling circuits 4, 6, 12 and associated volume changes of the coolant are not made noticeable or only made insignificantly noticeable in a change of the pressure inside the cooling circuits 4, 6, or 12.

During operation the control of the air-conditioning system 2 depends on the coolant temperatures at the temperature sensors 30, 49 and on the heat requirement in the interior. For this purpose a controller 64 is provided, which is connected to the three-way valves 32 and 52 and the temperature sensors 30, 49. If the interior of the automobile needs to be heated, it is determined by the controller 64 with the aid of the temperature sensors 30, 49 which of the cooling circuits 4, 6 has the higher coolant temperature. If the coolant temperature is higher in cooling circuit 4, the three-way valve 32 is switched with the aid of the controller 64 in such a manner that inlet a is connected to outlet b. The three-way valve 52 is switched in such a manner that inlet a is connected to outlet c. Consequently the heat exchanger 40 only has coolant flowing through it from the cooling circuit 4.

If a higher temperature prevails in the cooling circuit 6, the three-way valve 52 is switched by the controller 64 in such a manner that inlet a is connected to outlet b and three-way valve 32 such that inlet a is connected to outlet c. In this way the coolant from cooling circuit 6 flows through the heat exchanger 40. Coolant from cooling circuit 4 is passed around the heat exchanger 40 to the Y distributor 34. If there is no heat requirement, three-way valve 52 can be switched in such a manner that inlet a is connected to outlet c and three-way valve 32 in such a manner that inlet a is connected to outlet c. The heat exchanger 40 is therefore bypassed by both cooling circuits 4, 6.

Figure 2:
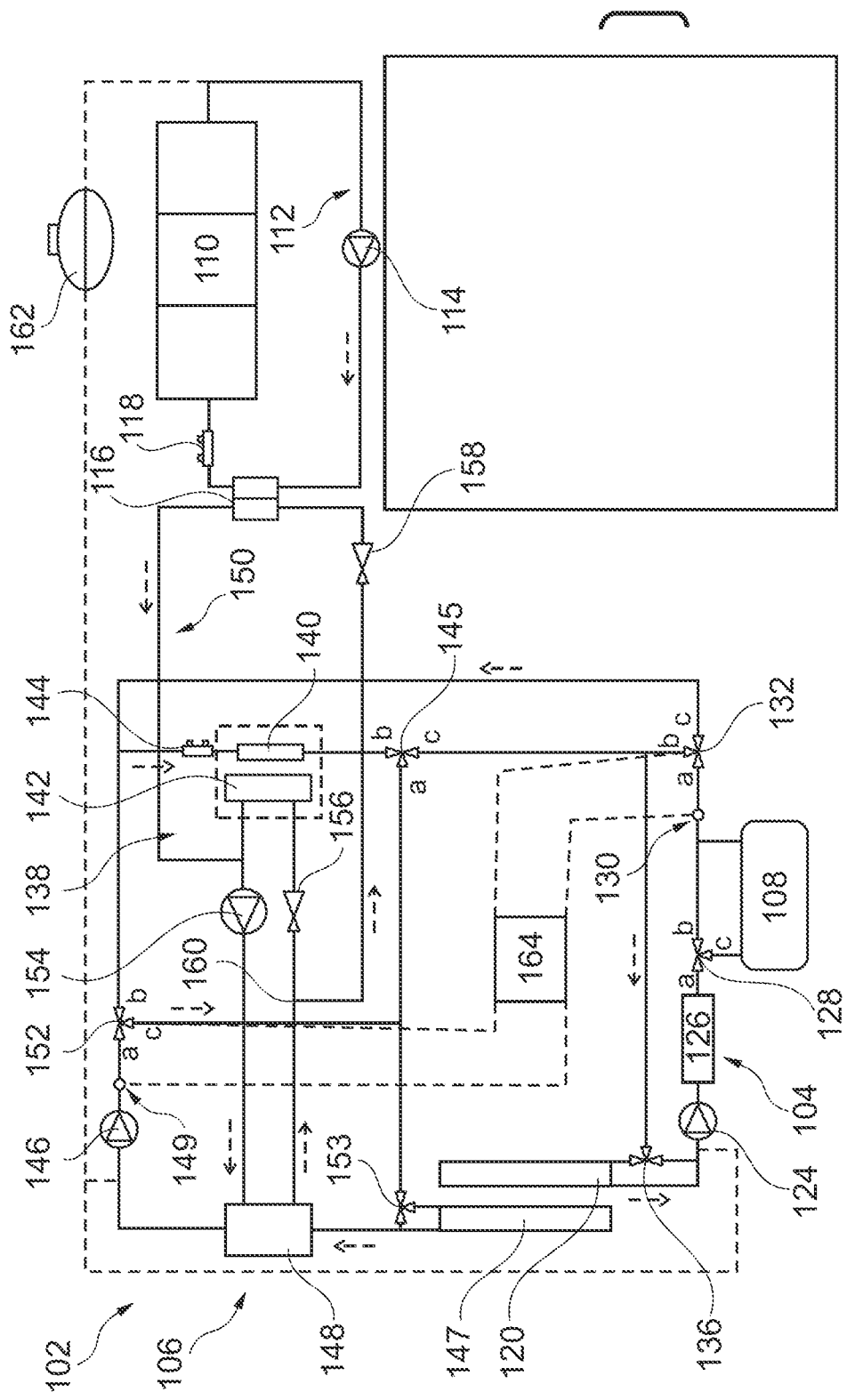
FIG. 2 shows an interior air-conditioning system according to a second embodiment.

FIG. 2 shows a second embodiment of an air-conditioning system 102. The air-conditioning system 102 has two cooling circuits 104, 106, where the cooling circuit 104 is used for cooling an electric drive motor 108. Cooling circuit 106 is configured as an air-conditioning system cooling circuit and is used inter alia for cooling a battery module 110. The battery module has a temperature-control circuit 112, comprising a pump 114 and a heat exchanger 116, by which means the temperature-control circuit 112 can deliver heat to the air-conditioning system cooling circuit 106. An auxiliary heater 118 can increase the coolant temperature in the temperature-control circuit 112 if necessary.

The cooling circuit 104 is connected to the first cooler 120. Coolant flow is achieved with the aid of a pump 124. The cooling circuit 104 cools power electronics 126. The electric drive motor 108 can be cooled by means of the three-way valve 128 via the connection a-c and a bypass to this can be made via the connection a-b. A temperature sensor 130 is connected downstream of the electric drive motor 108.

A three-way valve 132 produces a coolant flow back to the cooler 120 via the connection a-b. With the aid of the three-way valve 136, the cooler 120 can be bypassed for the purpose of more rapid heating of the coolant in the first cooling circuit 104. A connection to an air-conditioning module 138 is made via the connection a-c of the three-way valve 132, which module comprises a first heat exchanger 140 and a second heat exchanger 142, where the heat exchange 140 has coolant of the first cooling circuit 108 flowing there through. An auxiliary heater 144 is used as required to increase the coolant temperature in the heat exchanger 140 of the air-conditioning module 138. The three-way valve 145 closes the first cooling circuit 104 via the connection b-c.

The second cooling circuit 106 has a pump 146 which affects a coolant flow. Heat is delivered to a cooler 147. A condenser 148 is used to absorb heat in the air-conditioning system cooling circuit 106. The highest temperature in the air-conditioning system cooling circuit 106 is measured with the aid of the temperature sensor 149. The air-conditioning system cooling circuit 106 is connected via the condenser 148 to a cooling circuit 150.

The three-way valve 152 makes a connection to the cooler 147 via its connection a-c and produces a coolant flow to the air-conditioning module 138 via its connection a-b. A three-way valve 153 is used to bypass the cooler 147 in order to bring the coolant in the air-conditioning system cooling circuit more rapidly to operating temperature. The cooling circuit 150 is preferably operated with a refrigerant as coolant, for example, R-134a or R-1234yf. The cooling circuit 150 comprises a pump 154 which is preferably a compressor. A refrigerant flow is accomplished with the aid of the pump 154, whereby the refrigerant is compressed. Expansion valves 156, 158 located downstream of the condenser 148 are used to reduce the temperatures of the refrigerant. The heat exchanger 142 of the air-conditioning module 138 is located downstream of the expansion valve 156. The heat exchanger 160 to the temperature-control circuit 112 of the battery module is located downstream of the expansion valve 158. The refrigerant is distributed with the aid of a branch 160 to the heat exchangers 142 and 116.

In the embodiment of the air-conditioning system cooling circuit according to FIG. 2, as in the embodiment of the air-conditioning system cooling circuit according to FIG. 1, a compensating container 162 is provided, which is preferably configured in the manner of an expansion vessel. The compensating container 162 is assigned to the cooling circuits 104, 106 and 112 and keeps the pressure in these cooling circuits 104, 106 and 112 substantially constant so that any temperature variations of the coolant and associated volume changes are not made noticeable or only made insignificantly noticeable in a change of the pressure inside the respective cooling circuits 104, 106, or 112. The cooling circuits are preferably operated with water or a mixture of water and glycol as coolant.

During operation the control of the air-conditioning system 102 depends on the coolant temperatures at the temperature sensors 130, 149 and on the heat requirement in the interior. For this purpose a controller 164 is provided to which three-way valves 132 and 152 as well as temperature sensors 130, 149 are connected. Depending on the position of the three-way valves 132 and 152, the heat exchanger 140 either has coolant flowing through it from the first cooling circuit 104, the air-conditioning system cooling circuit 106 or no cooling circuit.

If a higher coolant temperature exists in the cooling circuit 104 than in the air-conditioning system cooling circuit 106, the three-way valve 132 is switched to the connection a-c and the three-way valve 152 is also switched to the connection a-c. If the coolant temperature in the air-conditioning system cooling circuit 106 is higher, if necessary the valve 152 is switched to the connection a-b and the three-way valve 132 is switched to the connection a-b. If there is no heat requirement in the heat exchanger 140, the three-way valve 132 is switched to the connection a-b and the three-way valve 152 in the cooling circuit 106 is switched to the connection a-c so that both cooling circuits do not flow through the heat exchanger 140.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An air-conditioning system for an automobile, comprising:
   a coolant loop having a first coolant circuit, a second coolant circuit, a module circuit, and a bypass circuit;
   a first three-way valve having a first inlet in fluid communication with the first cooling circuit, a first outlet in fluid communication with the module circuit and a second outlet in fluid communication with the bypass circuit;
   a second three-way valve having a second inlet in fluid communication with the second coolant circuit, a third outlet in fluid communication with the module circuit and a fourth outlet in fluid communication with the bypass circuit;
   an interior air-conditioning module connected in a heat-transporting manner to the module circuit; and
   a controller selectively controlling the first and second three-way valves in response to a coolant temperature in the first and second coolant circuits such that the module circuit is in fluid communication with one of the first or second coolant circuits which has a higher coolant temperature while the bypass circuit is in fluid communication with the other of the first or second coolant circuits which has a lower coolant temperature.

2. The air-conditioning system according to claim 1, further comprising a temperature sensor in each of the first and second cooling circuits, wherein the temperature sensors are connected to the controller in a signal-conducting manner.

3. The air-conditioning system according to claim 1, wherein the first and second cooling circuits serve as cooling circuits of a hybrid vehicle.

4. The air-conditioning system according to claim 1, wherein the first and second cooling circuits serve as cooling circuits of an electric vehicle.

5. The air-conditioning system according to claim 1, wherein at least one of the first and second cooling circuits is a drive cooling circuit, a power electronics cooling circuit, a charger cooling circuit, a battery cooling circuit, and/or an air-conditioning system cooling circuit.

6. The air-conditioning system according to claim 1, wherein at least one of the first and second cooling circuits is an air-conditioning system cooling circuit.

7. The air-conditioning system according claim 1, wherein the first and second cooling circuits have a common cooler.

8. The air-conditioning system according to claim 1, wherein the first and second cooling circuits have separate coolers.

9. The air-conditioning system according to claim 1, further comprising a cooling circuit for interior cooling.

10. The air-conditioning system according to claim , wherein the cooling circuit is configured as a cooling unit of the automobile.

11. The air-conditioning system according to claim 10, wherein the first and second cooling circuits comprise bypasses for the cooling units.

12. A method for operating an air-conditioning system of an automobile having a coolant loop including a first coolant circuit, a second coolant circuit, a module circuit, and a bypass circuit, and an interior air-conditioning module connected in a heat-transporting manner to the module circuit, the method comprising:
    controlling first and second valves when a coolant temperature in the first coolant circuit is greater than a coolant temperature in the second coolant circuit such that the module circuit is only in fluid communication with the first coolant circuit and the bypass module is only in fluid communication with the second cooling circuit; and
    controlling the first and second valves when the coolant temperature in the first coolant circuit is less than the coolant temperature in the second coolant circuit such that the module circuit is only in fluid communication with the second coolant circuit and the bypass module is only in fluid communication with the first cooling circuit.

* * * * *